(12) United States Patent
Watanabe (10) Patent No.: US 11,904,661 B2
(45) Date of Patent: Feb. 20, 2024

(54) REGISTER FOR AIR-CONDITIONING

(71) Applicant: TOYODA GOSEI CO., LTD., Kiyosu (JP)

(72) Inventor: Hiroto Watanabe, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 477 days.

(21) Appl. No.: 17/290,405

(22) PCT Filed: Sep. 27, 2019

(86) PCT No.: PCT/JP2019/038131
§ 371 (c)(1),
(2) Date: Jun. 30, 2021

(87) PCT Pub. No.: WO2020/100448
PCT Pub. Date: May 22, 2020

(65) Prior Publication Data
US 2021/0354533 A1 Nov. 18, 2021

(30) Foreign Application Priority Data
Nov. 15, 2018 (JP) .................. 2018-214912

(51) Int. Cl.
*B60H 1/34* (2006.01)
*B60H 1/00* (2006.01)
(52) U.S. Cl.
CPC ....... *B60H 1/3421* (2013.01); *B60H 1/00564* (2013.01)
(58) Field of Classification Search
CPC .................. B60H 1/3421; B60H 1/00564

USPC ........................................ 454/155
See application file for complete search history.

(56) References Cited

U.S. PATENT DOCUMENTS

2017/0021692 A1  1/2017  Terai et al.

FOREIGN PATENT DOCUMENTS

| JP | 2011-079374 A | 4/2011 |
|----|---------------|--------|
| JP | 2013-006569 A | 1/2013 |
| JP | 2013-116650 A | 6/2013 |
| JP | 2015-163489 A | 9/2015 |

(Continued)

OTHER PUBLICATIONS

International Search Report of the International Searching Authority dated Nov. 12, 2019 for the corresponding International application No. PCT/JP2019/038131 (and English translation).

*Primary Examiner* — Allen R. B. Schult
(74) *Attorney, Agent, or Firm* — POSZ LAW GROUP, PLC (57) ABSTRACT

A rear wall of an instrument panel has an outlet port and an inclined wall. An angle defined by the inclined wall and a vertical plane is from 30° to 40°. An upper fin and a lower fin are both supported by fin pivots. The lower fin is configured to be inclinable downward by at most 30° with respect to a horizontal plane. When the lower fin is inclined downward by a maximum angle, an interlocking mechanism inclines the upper fin together with the lower fin in an interlocking manner such that an angle of the upper fin with respect to the lower fin is greater than that when in a horizontal state. A bottom wall of a retainer includes an inclined surface located under an upstream end of the lower fin. The inclined surfaced is inclined upward toward the downstream end.

5 Claims, 7 Drawing Sheets

(56) References Cited

FOREIGN PATENT DOCUMENTS

JP 2017-024555 A 2/2017
KR 101763671 B1 * 8/2017 ........... B60H 1/3421

* cited by examiner

Fig.11A
Swing Angle:0°

Fig.11B
Swing Angle:15°

Fig.11C
Swing Angle:25°

Fig.11D
Swing Angle:30°

REGISTER FOR AIR-CONDITIONING

CROSS REFERENCE TO RELATED APPLICATIONS

This application is a U.S. national stage application of international Application No. PCT/JP2019/038131 filed on Sep. 27, 2019, and claims priority to Japanese Application No. 2018-214912 filed on Nov. 15, 2018, the contents of which are incorporated herein by reference.

TECHNICAL FIELD

The present disclosure relates to an air-conditioning register. The air-conditioning register blows air-conditioning air delivered from an air conditioner into a compartment through an outlet port. The outlet port is located in a rear wall of an instrument panel. The air-conditioning register also changes a blowing direction of the air-conditioning air from the outlet port.

BACKGROUND ART

Land vehicles have an air-conditioning register that is installed in the instrument panel. The air-conditioning register changes the direction of air-conditioning air, which is delivered from an air conditioner and blown into the passenger compartment through an outlet port. Such an air-conditioning register includes a tubular retainer having a vent passage for air-conditioning air. The vent passage accommodates fins that extend in the vehicle width direction. The fins are supported with fin pivots so as to be inclinable in the vertical direction with respect to the retainer.

Figure 10:
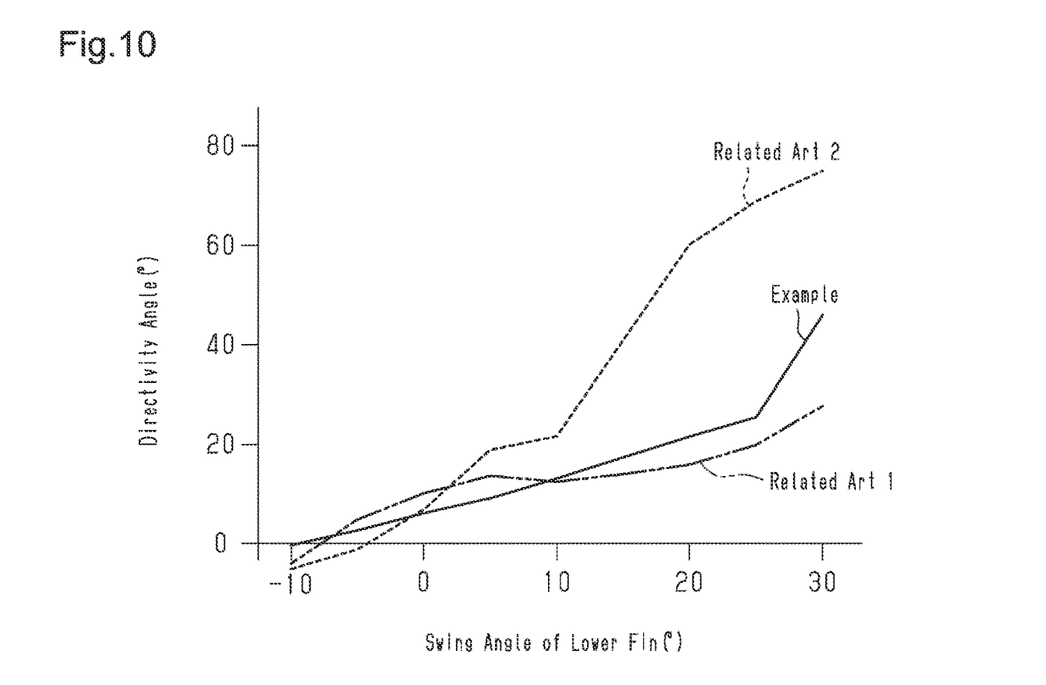
FIG. 10 is a graph showing results of simulations performed to find out the relationship between the swing angle in the vertical direction of the lower fin (fin) and the directivity angle in the vertical direction in each of the Example, Related Art 1, and Related Art 2.

The above-described air-conditioning register delivers air-conditioning air from the air conditioner to the retainer, causes the air-conditioning air to flow along the fins, and blows out the air-conditioning air through the outlet port. When the fins are inclined in the vertical direction, the blowing direction of the air-conditioning air through the outlet port changes. The angle of the fin with respect to the horizontal plane will be referred to as a swing angle. The angle of the direction in which air-conditioning air is blown out with respect to the horizontal plane will be referred to as "directivity angle." FIG. 10 shows results of simulations performed to find out the relationship between the swing angle in the vertical direction of fins and the directivity angle in the vertical direction. In FIG. 10, Related Art 1, which is represented by the long-dash double-short-dash line, shows the result of the above-described typical air-conditioning register. In Related Art 1, the directivity angle is increased or reduced in correspondence with an increase or reduction in the swing angle.

The above-described air-conditioning register is typically provided in an upper part of the rear wall of an instrument panel. The outlet port is preferably inconspicuous to occupants from a viewpoint of aesthetic appeal. Accordingly, the air-conditioning register is provided in a lower part of the rear wall of the instrument panel in some cases.

In this regard, the position of a typical air-conditioning register, which is designed to be arranged in an upper part of the instrument panel, may simply be changed to a lower part of the instrument panel. However, since the variable range of the directivity angle is narrow as indicated by Related Art 1 in FIG. 10, it is difficult to blow air-conditioning air to a wide region in the vertical direction of the body of an occupant. For example, although it is possible to blow the air-conditioning air to a region ranging from the abdomen to the throat of the occupant, the air-conditioning air cannot be blown out to the region above, which includes the head.

In this regard, Patent Document 1 discloses an air-conditioning register that causes upward air-conditioning air blown out from the outlet port to flow further upward. Specifically, the air-conditioning register causes the air-conditioning air to flow along the rear wall of the instrument panel by using the Coanda effect. This air-conditioning register includes an inclined wall in a part of the rear wall of the instrument panel that is adjacent to and above the outlet port. The inclined wall is inclined upward toward the downstream end. Thus, if the fins are inclined upward by a large swing angle toward the downstream end, the air-conditioning air that is blown upward from the outlet port flows along the inclined wall due to the Coanda effect. The air-conditioning air therefore flows further upward than in a case in which the Coanda effect does not occur. In this manner, the variable range of the directivity angle is expanded upward.

PRIOR ART DOCUMENT

Patent Document

Patent Document 1: Japanese Laid-Open Patent Publication No. 2015-163489

SUMMARY OF THE INVENTION

Problems that the Invention is to Solve

However, related-art air-conditioning registers, including the one disclosed in Patent Document 1, that change the flowing direction of air-conditioning air using the Coanda effect, have the following drawbacks.

In FIG. 10, Related Art 2, which is indicated by the broken line, shows a result related to a related-art air-conditioning register in which the Coanda effect occurs. In this air-conditioning register, when a fin is inclined upward from a horizontal state (swing angle: 0°) toward the downstream end, the directivity angle increases substantially in proportion to the increase in the swing angle when the swing angle is less than or equal to a predetermined value (10°). The air-conditioning air is blown substantially in the direction in which the fin is oriented. However, when the swing angle exceeds the predetermined value (10°), the Coanda effect becomes excessive, so that the directivity angle increases abruptly. As a result, the air-conditioning air cannot be easily blown out to a desired region of the body of an occupant, such as the head.

It is an objective of the present disclosure to provide an air-conditioning register that is capable of blowing out air-conditioning air to a desired region of the upper body of an occupant, while expanding the variable range of the directivity angle upward by using the Coanda effect.

Means for Solving the Problems

To achieve the foregoing objective, an air-conditioning register including a retainer is provided. The retainer includes a vent passage for air-conditioning air. The vent passage includes a downstream end in a direction of a flow of the air-conditioning air in the retainer. The downstream end is connected to an outlet port in a rear wall of an instrument panel. The rear wall includes an inclined wall in a section above and adjacent to the outlet port. The inclined wall is inclined upward toward a downstream side. An angle defined by the inclined wall and a vertical plane is from 30° to 40°. The retainer accommodates an upper fin and a lower fin. The lower fin and the upper fin are located on an upstream side of the outlet port. The lower fin extends in a vehicle width direction. The upper fin is located above the lower fin and extends in the vehicle width direction. The lower fin and the upper fin are both supported by fin pivots so as to be inclinable vertically. Downstream ends of an upper wall of the retainer, the upper fin, the lower fin, and a bottom wall of the retainer are arranged to be progressively shifted to an upstream side toward a lower end. The lower fin is configured to be inclinable upward toward the downstream end by at most 30° with respect to a horizontal plane. The air-conditioning register further includes an interlocking mechanism configured such that, when the lower fin is inclined by a maximum angle with respect to the horizontal plane so as to be inclined upward toward the downstream end, the interlocking mechanism inclines the upper fin together with the lower fin in an interlocking manner such that an angle of the upper fin with respect to the lower fin is greater than that when in a horizontal state of the lower fin and the upper fin. The bottom wall includes an inclined surface located under an upstream end of the lower fin, the inclined surface being inclined upward toward the downstream end.

With the above-described configuration, when the lower fin is inclined upward from the horizontal state toward the downstream end, within a region to an angle close to 30°, for example within a region to 25°, the inclining motion is transmitted to the upper fin by the interlocking mechanism. The upper fin is inclined upward toward the downstream end together with the lower fin in an interlocking manner. At this time, the Coanda effect does not or is unlikely to occur. The air-conditioning air flows along the lower fin and the upper fin.

The angle of the lower fin with respect to a horizontal plane will be referred to as a swing angle. The angle of the direction in which air-conditioning air is blown out with respect to a horizontal plane will be referred to as a directivity angle. When the swing angle changes within a range from 0° to an angle close to 30°, for example, 25°, the directivity angle changes accordingly to be the same as or substantially the same as the swing angle. The air-conditioning air is blown out from the outlet port in the direction in which the lower fin and the upper fin are oriented. This allows the air-conditioning air to be blown out to a desired region of the upper body of an occupant.

When the lower fin is inclined such that the swing angle becomes an angle close to 30°, for example, an angle that is greater than 25° and less than or equal to 30°, the upper fin is inclined together with the lower fin in an interlocking manner. The clearance between the upper fin and the upper wall of the retainer is narrow, so that the air-conditioning air does not flow smoothly between the upper fin and the upper wall. Also, the clearance between the upper fin and the lower fin is reduced. When the lower fin is inclined upward by the maximum angle toward the downstream end, the angle in the same direction of the upper fin with respect to the lower fin is greater than that when in the horizontal state. The upstream end of the upper fin is close to the lower fin, reducing the clearance between the fins. The air-conditioning air does not flow smoothly between the upper fin and the lower fin. Most of the air-conditioning air thus flows between the lower fin and the bottom wall.

The lower fin and the upper fin are both inclined upward toward the downstream ends. The bottom wall includes the inclined surface under the upstream end of the lower fin. The inclined surface is inclined upward toward the downstream end. Part of the air-conditioning air that flows in the vicinity of the bottom wall in the retainer flows along the inclined surface, so that the flowing direction is inclined upward toward the downstream end. This part of the air-conditioning air is guided to the clearance between the bottom wall and the lower fin, which is inclined upward toward the downstream end. Accordingly, a greater amount of air-conditioning air flows along the lower fin and thus in a direction that is inclined upward toward the downstream end.

In this state, the air-conditioning air that flows in a direction that is inclined upward toward the downstream end as described above passes the upper inclined wall after passing through the outlet port. At this time, the Coanda effect occurs so that the air-conditioning air is pulled toward to the inclined wall. The air-conditioning air flows in a direction along the inclined wall, that is, in a direction that is inclined upward toward the downstream end. Accordingly, even though the outlet port of the air-conditioning register is located in a lower position in front of the occupant, the air-conditioning air flows toward the space above the head of the occupant. In this manner, the variable range of the directivity angle is expanded upward.

In the above-described air-conditioning register, when the lower fin is inclined by the maximum angle with respect to the horizontal plane, the interlocking mechanism preferably increases the angle of the upper fin with respect to the lower fin by at most 5° as compared to when in the horizontal state.

With the above-described configuration, when the lower fin is inclined upward by the maximum angle toward the downstream end, the angle of the upper fin with respect to the lower fin is greater by at most 5° than that when in the horizontal state. Accordingly, the clearance between the upstream end of the upper fin and the lower fin has such a size that the upstream end is unlikely to interfere with the lower fin and that the air-conditioning air does not smoothly pass through the clearance.

In the above-described air-conditioning register, the inclined surface is preferably a downstream inclined surface. The bottom wall preferably includes a recess that is recessed downward. The downstream inclined surface is preferably formed in a downstream portion of an inner bottom surface of the recess. The recess preferably includes an upstream inclined surface in the inner bottom surface. The upstream inclined surface is preferably located on an upstream side of the downstream inclined surface and is inclined downward toward the downstream end.

With the above-described configuration, when the lower fin is inclined upward by the maximum angle or substantially by the maximum angle toward the downstream end, the air-conditioning air is restricted from passing through the clearance between the upper wall and the upper fin and from passing through the clearance between the upper fin and the lower fin. Most of the air-conditioning air in turn flows through the clearance between the lower fin and the bottom wall. Part of the air-conditioning air that flows in the vicinity of the bottom wall is likely to enter the recess. The air-conditioning air that has entered the recess flows along the upstream inclined surface. Thus, the air-conditioning air is smoothly guided to the downstream inclined surface while changing the flowing direction to a diagonally downward direction.

In the above-described air-conditioning register, the upstream inclined surface and the downstream inclined surface are preferably connected to each other by a curved surface that is curved so as to bulge downward.

With the above-described configuration, when the lower fin is inclined upward by the maximum angle or substantially by the maximum angle toward the downstream end, part of the air-conditioning air that flows in the vicinity of the bottom wall enters the recess and then flows along the curved surface, which is curved in a manner bulging downward, after flowing along the upstream inclined surface. The air-conditioning air is thus guided to the downstream inclined surface while gradually changing the flowing direction.

In the above-described air-conditioning register, the downstream inclined surface is preferably inclined by 30°±5° with respect to the horizontal plane.

With the above-described configuration, the angle by which the downstream inclined surface is inclined (30°±5°) with respect to the horizontal plane is similar to the angle of the lower fin when inclined by the maximum angle (30°). The flowing direction of the air-conditioning air that flows along the downstream inclined surface is substantially the same as the flowing direction of the air-conditioning air that flows along the lower fin. This further increases the amount of the air-conditioning air that flows along the lower fin.

Effects of the Invention

The above-described air-conditioning register is capable of blowing out air-conditioning air to a desired region of the upper body of an occupant, while expanding the variable range of the directivity angle upward by using the Coanda effect.

MODES FOR CARRYING OUT THE INVENTION

An air-conditioning register for a land vehicle according to one embodiment will now be described with reference to the drawings.

In the following description, the direction in which the land vehicle advances (moves forward) will be referred to as the front, and the reverse direction will be referred to as the rear. The height direction of the land vehicle will be referred to as the vertical direction. The width direction (left-right direction) of the land vehicle is defined with reference to the state in which the land vehicle is viewed from the rear.

Figure 1:
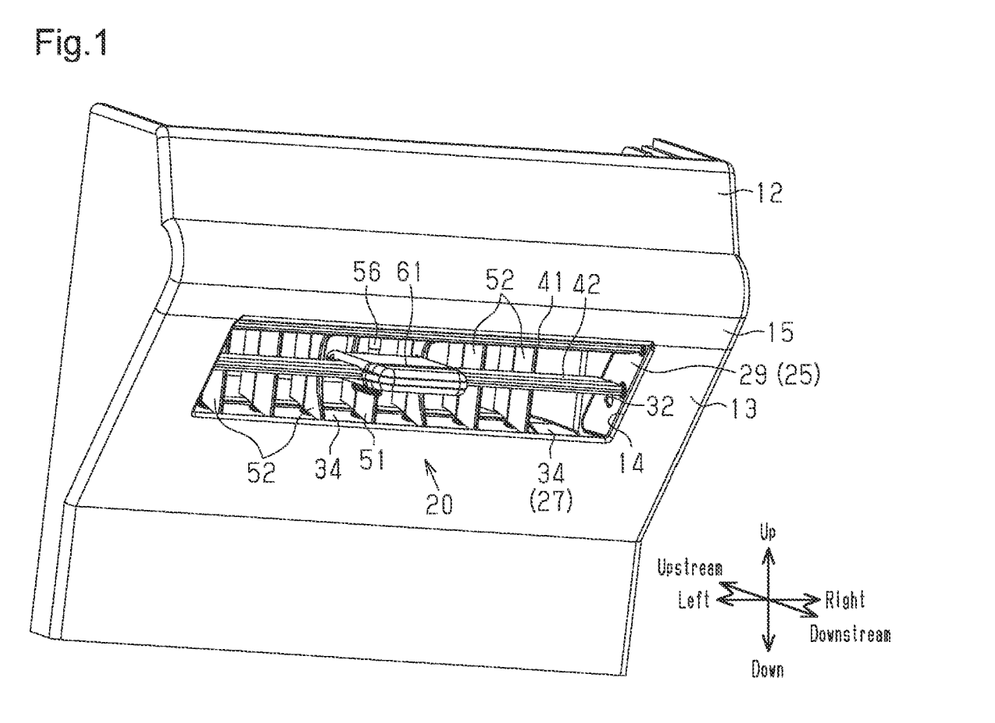
FIG. 1 is a perspective view of an air-conditioning register according to one embodiment.
Figure 2:
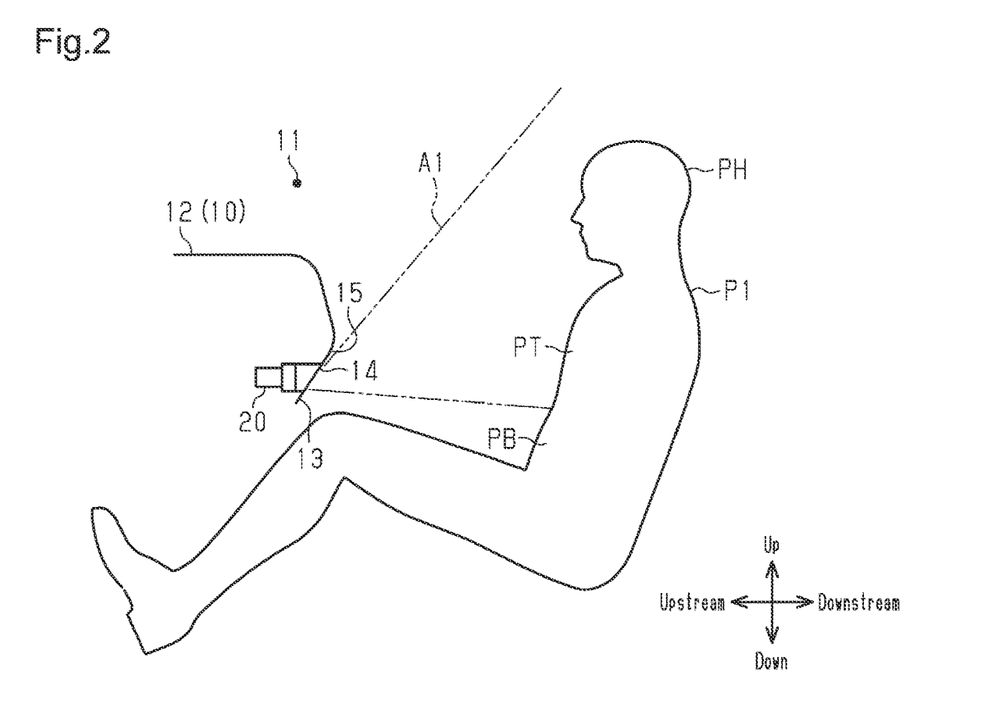
FIG. 2 is a schematic diagram of the embodiment, showing a variable range of a directivity angle in the vertical direction of air-conditioning air that is blown out from an outlet port toward an occupant.

As shown in FIGS. 1 and 2, a land vehicle 10 includes an instrument panel 12, which extends along the entire width of a passenger compartment 11 and is arranged in front of the front seats (driver's seat and front passenger seat). The instrument panel 12 incorporates air-conditioning registers 20 at the center and the sides with reference to the left-right direction. FIG. 1 shows the instrument panel 12 in a reduced scale in the left-right direction. The instrument panel 12 includes a rear wall 13, which faces the passenger compartment 11 and is partly inclined so as to be progressively shifted to the rear toward the upper end. The rear wall 13 has an outlet port 14 in the inclined part. The outlet port 14 has a rectangular shape with the dimension in the left-right direction being longer than the dimension in the vertical direction.

Figure 5:
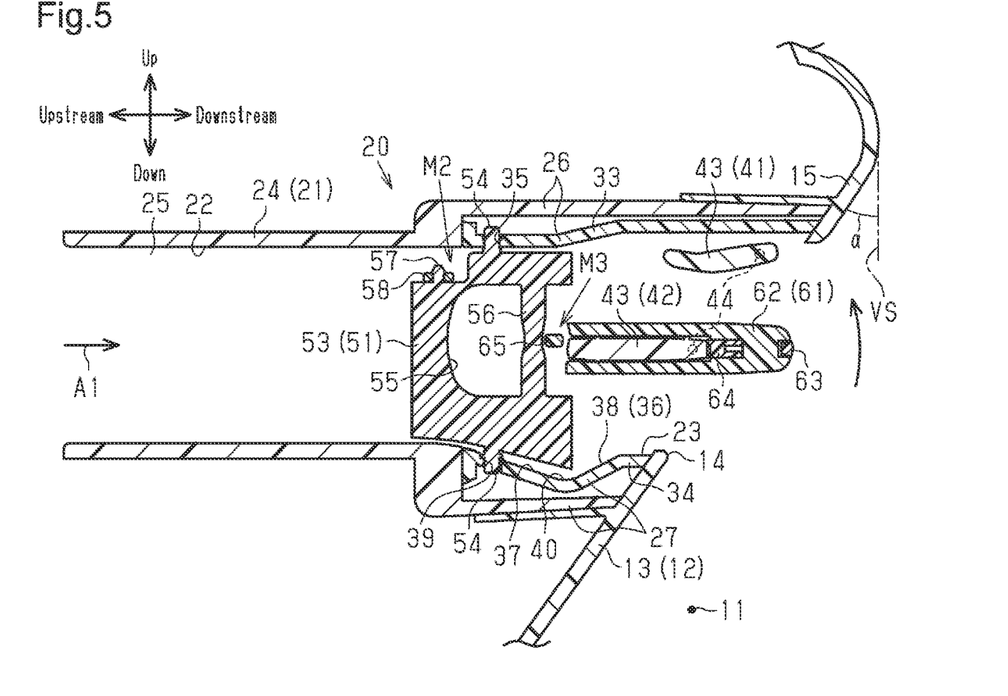
FIG. 5 is a cross-sectional side view of the air-conditioning register of the embodiment.
Figure 6:
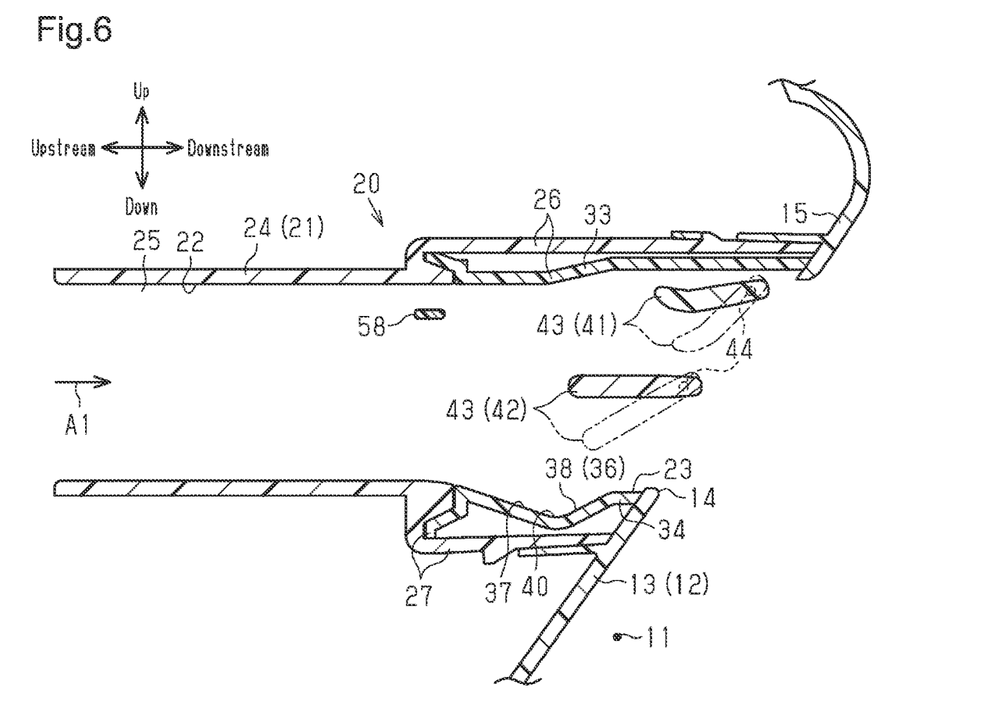
FIG. 6 is a cross-sectional side view of the air-conditioning register of the embodiment, showing a section different from that in FIG. 5.

As shown in FIG. 5, the rear wall 13 includes an inclined wall 15. The inclined wall 15 is adjacent to and above the outlet port 14, and is inclined so as to be progressively shifted to the rear toward the upper end. An angle α defined by the inclined wall 15 and a vertical plane VS is 30° to 40°. The angle α is more preferably 31° to 36°.

Figure 3:
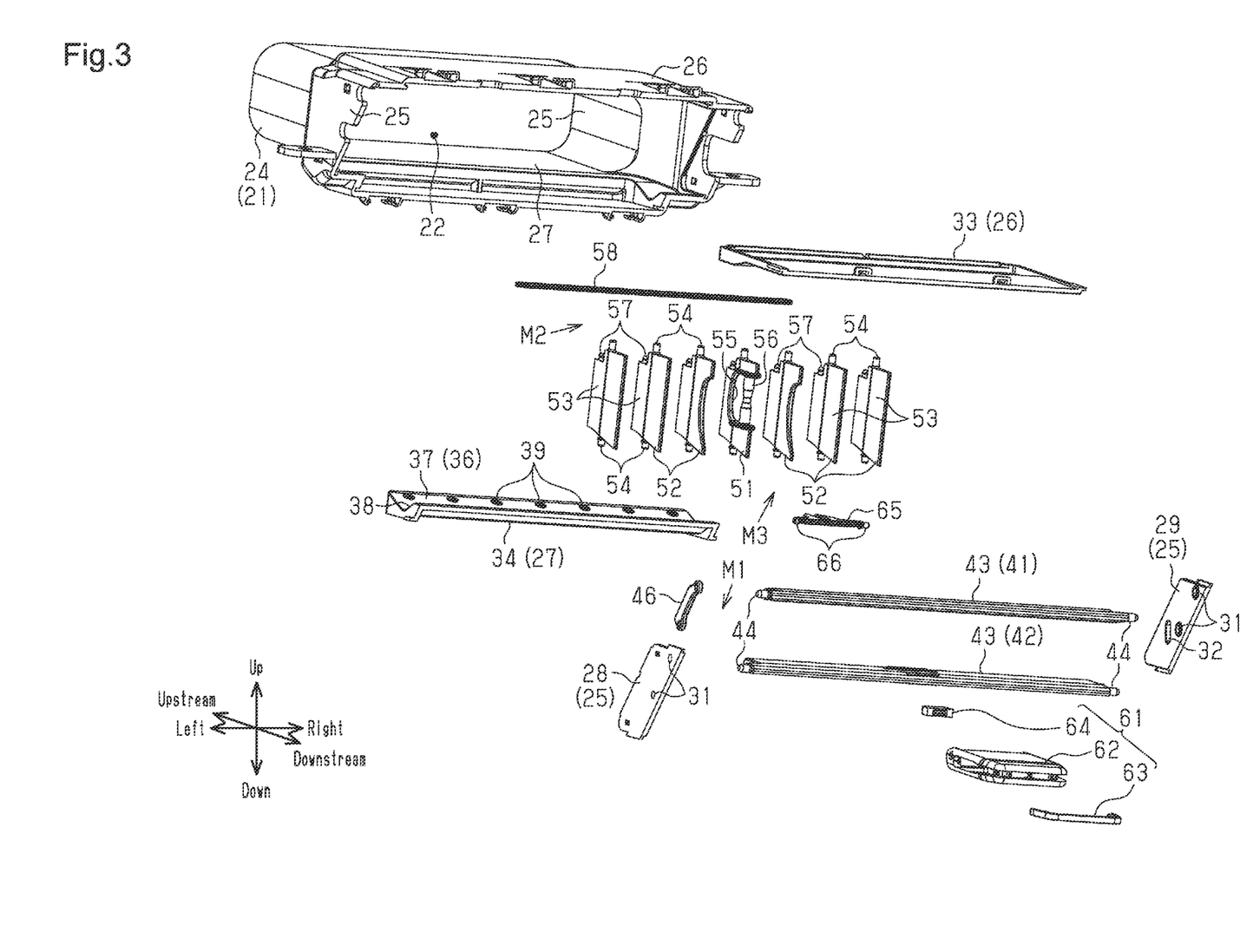
FIG. 3 is an exploded perspective view showing some of the components of the air-conditioning register of the embodiment.
Figure 4:
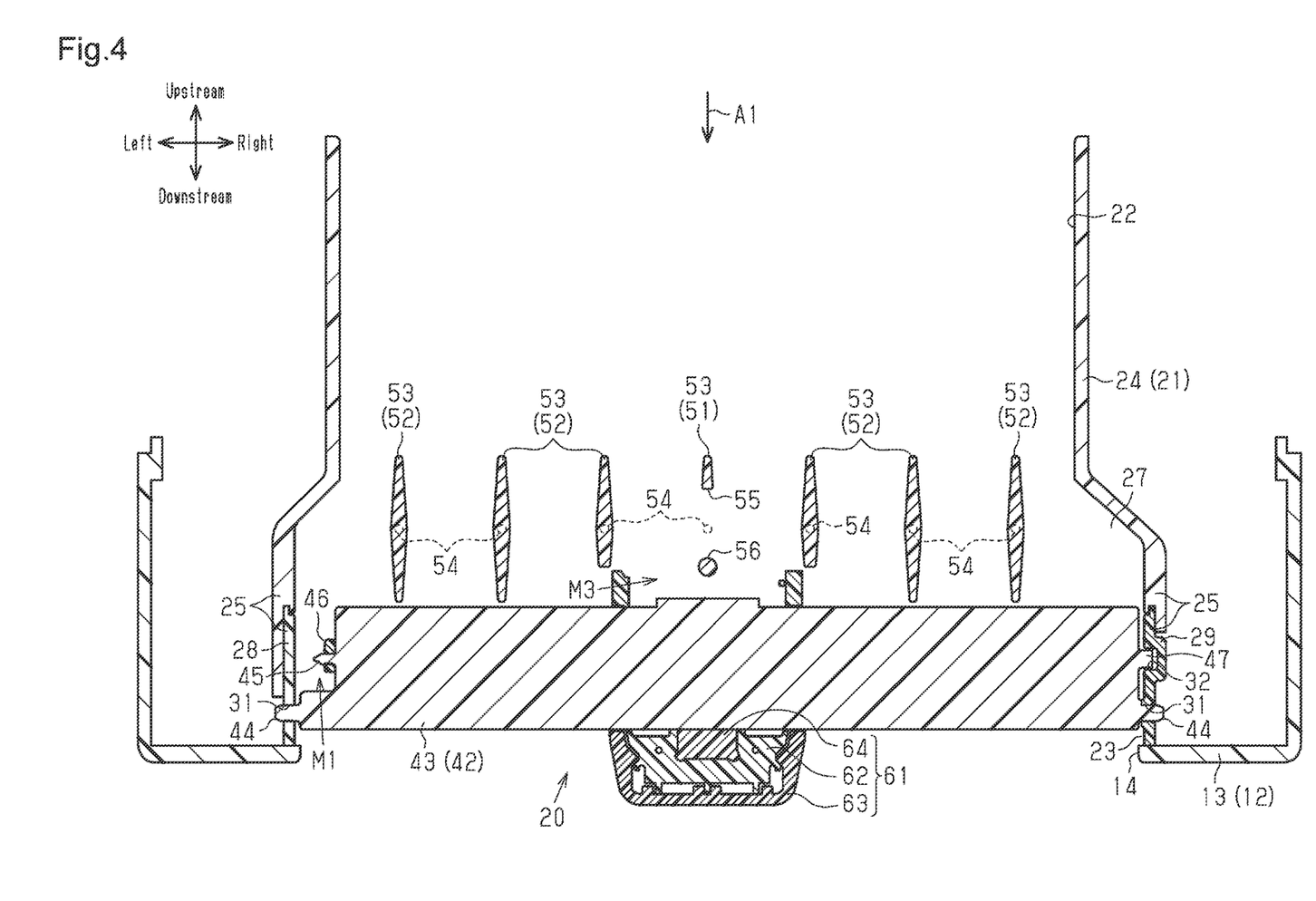
FIG. 4 is a cross-sectional plan view of the air-conditioning register of the embodiment.

As shown in FIGS. 3 to 5, the air-conditioning register 20 includes a retainer 21, downstream fins, a first interlocking mechanism M1, upstream fins 51, 52, a second interlocking mechanism M2, an operation knob 61, and a transmission mechanism M3. The above-described outlet port 14 and inclined wall 15 are also used as parts of the air-conditioning register 20. Each component of the air-conditioning register 20 will now be described.

Retainer 21

The retainer 21 is configured to connect the duct (not shown) of the air conditioner to the outlet port 14. The internal space of the retainer 21 forms a passage (hereinafter, referred to as a "vent passage 22") for air-conditioning air A1, which is delivered from the air conditioner via the duct. With reference to the direction in which the air-conditioning air A1 flows, the side closer to the air conditioner will be referred to as an upstream side, and the side farther from the air conditioner will be referred to as a downstream side. The upstream side agrees with the front side of the land vehicle, and the downstream side agrees with the rear side of the land vehicle. The inclined wall 15 is inclined upward toward the downstream side.

When the retainer 21 is attached to the instrument panel 12, a downstream end 23 of the retainer 21 is adjacent to and on the upstream side of the outlet port 14. The downstream end of the vent passage 22 is connected to the outlet port 14.

The retainer 21 includes a retainer body 24 and shims. The retainer body 24 forms the main portion of the retainer 21 and is substantially shaped as a tube with an open upstream end and an open downstream end.

The vent passage 22 is surrounded by four walls of the retainer 21. The four walls include two vertical walls 25, which face each other in the left-right direction, an upper wall 26, which connects the upper ends of the vertical walls 25 to each other, and a bottom wall 27, which connects the lower ends of the vertical walls 25 to each other. The downstream end of the upper wall 26 is located on the downstream side of the downstream end of the bottom wall 27.

The shims include two first shims 28, 29 and two second shims 33, 34. The shims are all made of a material softer than that of the retainer body 24. The first shims 28, 29 are plates that extend in the vertical direction and in the flowing direction. The first shims 28, 29 serve as parts of the vertical walls 25, and are arranged at the left and right sides in the downstream portion in the retainer body 24. The second shims 33, 34 are plates that extend in the left-right direction and in the flowing direction, and are arranged in the upper part and the lower part in the retainer body 24. The upper second shim 33 forms a part of the upper wall 26, and the lower second shim 34 forms a part of the bottom wall 27. The first shims 28, 29 and the second shims 33, 34 face the vent passage 22.

Each of the first shims 28, 29 has pivot receiving holes 31 in an upper portion on the downstream side. The pivot receiving holes 31 are spaced apart from each other in the vertical direction. The upper pivot receiving holes 31 are formed at the upper ends of the first shims 28, 29. The lower pivot receiving holes 31 are formed in the center portions in the vertical direction of the first shims 28, 29. The right-side first shim 29 has a guide groove 32, which has the shape of a circular arc and is located on the upstream side of the lower pivot receiving hole 31. The center point of the circular arc of the guide groove 32 agrees with the pivot receiving hole 31.

Figure 8:
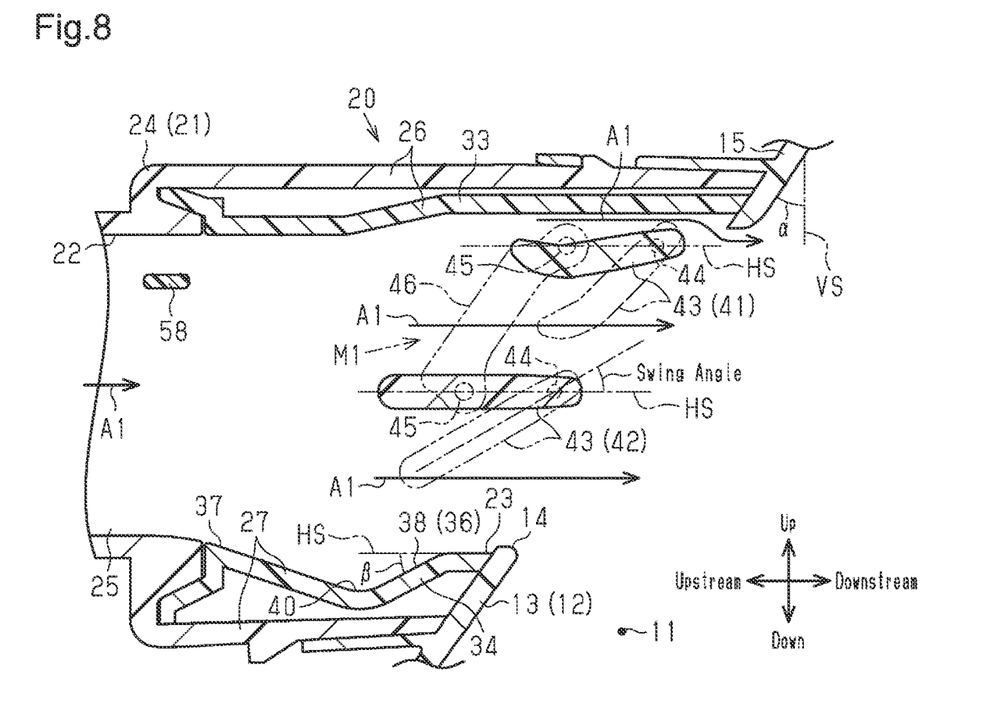
FIG. 8 is a partial cross-sectional side view of the air-conditioning register of the embodiment, illustrating the positional relationship of the upper and lower fins and the vertical coupling rod, when the lower fin is in a horizontal state (swing angle: 0°).

The upper second shim 33 has pivot receiving holes 35 in an upstream portion at several positions spaced apart in the left-right direction. The lower second shim 34 includes a recess 36, which is recessed downward. As shown in FIG. 8, the inner bottom surface of the recess 36 has two inclined surfaces, which are adjacent to each other in the flowing direction. To distinguish the inclined surfaces, the one on the upstream side will be referred to as an upstream inclined surface 37, and the one on the downstream side will be referred to as a downstream inclined surface 38. The upstream inclined surface 37 is inclined downward by a constant angle with respect to a horizontal plane HS toward the downstream end. The downstream inclined surface 38 is located under the upstream end of a lower fin 42, which will be discussed below. The downstream inclined surface 38 is inclined upward by a constant angle β with respect to the horizontal plane HS toward the downstream end. The angle β is 30°±5° in the present embodiment. As shown in FIGS. 5 and 8, the upstream inclined surface 37 and the downstream inclined surface 38 are connected to each other by a curved surface 40, which is curved in a manner bulging downward. The upstream inclined surface 37 has pivot receiving holes 39 in an upstream portion at positions below the pivot receiving holes 35 of the second shim 33.

Downstream Fins and First Interlocking Mechanism M1

As shown in FIGS. 3 to 5, the downstream fins are configured to change the direction of the air-conditioning air A1 blown out from the outlet port 14 vertically, and include an upper fin 41 and a lower fin 42 arranged under the upper fin 41. The upper fin 41 is arranged at the upper end of the vent passage 22 and close to the upper wall 26 (second shim 33). The lower fin 42 is arranged substantially at the center in the vertical direction of the vent passage 22. When the upper fin 41 and the lower fin 42 are in a horizontal state, the clearance between the lower fin 42 and the bottom wall 27 is wider than the clearance between the upper fin 41 and the upper wall 26.

The upstream end of the upper fin 41 is located on the upstream side of the downstream end of the upper wall 26. The downstream end of the lower fin 42 is located on the upstream side of the downstream end of the upper fin 41, and on the downstream side of the downstream end of the bottom wall 27. The downstream end of the lower fin 42 is always located on the downstream side of the upstream end of the upper fin 41 regardless of the inclination of the upper fin 41. In this manner, the downstream ends of the upper wall 26, the upper fin 41, the lower fin 42, and the bottom wall 27 are arranged to be progressively shifted to the upstream side toward the lower end.

The upper fin 41 and the lower fin 42 each include a fin body 43, which forms a framework, and a pair of fin pivots 44. As shown in FIGS. 3 to 6, each fin body 43 is a plate that extends in the left-right direction and in the flowing direction, and is arranged in the vicinity of and on the upstream side of the outlet port 14. The fin pivots 44 of the upper fin 41 are provided at the opposite ends in the left-right direction of the fin body 43 and located at the downstream end in the flowing direction. Likewise, the fin pivots 44 of the lower fin 42 are provided at the opposite ends in the left-right direction of the fin body 43 and located at the downstream end in the flowing direction. The fin pivots 44 are engaged with the corresponding pivot receiving holes 31 of the first shims 28, 29, so that the upper fin 41 and the lower fin 42 are supported to be inclinable in the vertical direction at the fin pivots 44 with respect to the first shims 28, 29.

Figure 7:
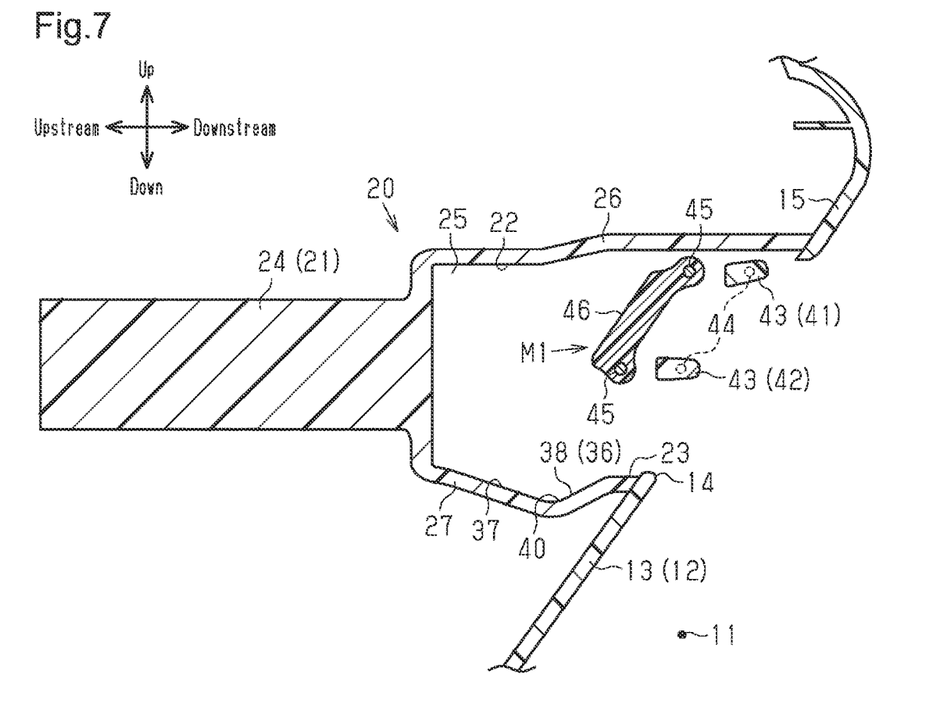
FIG. 7 is a cross-sectional side view of the air-conditioning register of the embodiment, showing a section different from those in FIGS. 5 and 6.

As shown in FIGS. 4 and 7, each fin body 43 includes a coupling pin 45 at the left end. The coupling pin 45 is located at a position shifted upstream from the corresponding fin pivot 44. The coupling pins 45 are coupled to each other by a vertical coupling rod 46. The coupling pins 45 and the vertical coupling rod 46 form the first interlocking mechanism M1, which mechanically couples the upper fin 41 and the lower fin 42 to each other, so as to incline the upper fin 41 together with the lower fin 42 in an interlocking manner.

Also, as shown in FIGS. 3 and 4, the fin body 43 of the lower fin 42 includes a guide pin 47 at the right end. The guide pin 47 is located at a position shifted upstream from the corresponding fin pivot 44. The guide pin 47 is engaged with the guide groove 32 in the right-side first shim 29. The guide pin 47 is permitted to move in the vertical direction in the guide groove 32 in response to an inclining motion of the lower fin 42 about the fin pivots 44. When the lower fin 42 is inclined downward by 30° from the horizontal state, the guide pin 47 contacts the lower end of the guide groove 32. This restricts further downward inclination of the lower fin 42. When the lower fin 42 is inclined upward by a predetermined angle from the horizontal state, the guide pin 47 contacts the upper end of the guide groove 32. This restricts further upward inclination of the lower fin 42.

As shown in FIG. 8, the angle of a fin (upper fin 41, lower fin 42) with respect to the horizontal plane HS will be referred to as a swing angle. The angle of the direction in which the air-conditioning air A1 is blown out with respect to the horizontal plane HS will be referred to as "directivity angle." As shown in FIG. 7, the positions of the coupling pins 45 of the upper fin 41 and the lower fin 42 in the first interlocking mechanism M1 are determined, such that, when the upper fin 41 and the lower fin 42 are inclined downward from the horizontal state, the swing angle of the upper fin 41 becomes greater than the swing angle of the lower fin 42 by at most 5° as the swing angles increase. The present embodiment is configured such that, when the lower fin 42 is inclined downward by the maximum angle (30°) from the horizontal state, the swing angle of the upper fin 41 is 35°. In this manner, when the lower fin 42 is inclined upward by the maximum angle toward the downstream end with respect to the horizontal plane HS, the angle of the upper fin 41 with respect to the lower fin 42 is increased by at most 5° as compared to when in the horizontal state.

Upstream Fins 51, 52 and Second Interlocking Mechanism M2

As shown in FIGS. 3 to 5, the upstream fins 51, 52 are configured to change the direction of the air-conditioning air A1 blown out from the outlet port 14 laterally. The fins 51, 52 each include a fin body 53, which forms the main portion, and a pair of fin pivots 54.

Each fin body 53 is a plate that extends in the vertical direction and in the flowing direction. The fin pivots 54 of each of the fins 51, 52 are provided at the opposite ends in the vertical direction of the fin body 53. The fin pivots 54 are engaged with the corresponding pivot receiving holes 35, 39 of the second shims 33, 34, so that the fins 51, 52 are supported to be inclinable with respect to the second shims 33, 34.

The fin 51 is one of the upstream fins and located at the center in the left-right direction. The fin 51 includes a cutout 55 and a transmission shaft 56. The transmission shaft 56 extends in the vertical direction in the cutout 55.

Each fin body 53 includes a coupling pin 57 at the upper end. The coupling pin 57 is located at a position shifted upstream from the fin pivot 54. The coupling pins 57 of the fins 51, 52 are coupled to each other by a lateral coupling rod 58, which extend in the left-right direction. The coupling pins 57 and the lateral coupling rod 58 form the second interlocking mechanism M2, which mechanically couples all the fins 51, 52 together, so as to incline the fins 52 together with the fin 51 in an interlocking manner.

Operation Knob 61

The operation knob 61 is a member operated by an occupant P1 when changing the blowing direction of the air-conditioning air A1 from the outlet port 14. The operation knob 61 has a knob body 62, which is the main portion, a knob cover 63, which is attached to the knob body 62 from the downstream direction, and a shim 64. The operation knob 61 is attached to the fin body 43 of the lower fin 42 so as to be slidable in the left-right direction. The operation knob 61 is inclinable about the fin pivots 44 together with the lower fin 42. The operation knob 61 is slid on the lower fin 42, so as to be displaceable in the left-right direction. The shim 64 is attached to the knob body 62 and contacts the fin body 43 of the lower fin 42 while being elastically deformed. The contacting state generates sliding resistance between the shim 64 and the fin body 43 when the operation knob 61 is slid, so that an adequate load is added to the sliding operation.

Transmission Mechanism M3

The transmission mechanism M3 is a mechanism that transmits a sliding motion of the operation knob 61 to the fin 51 and includes a fork 65. The fork 65 is supported by the knob body 62 with a shaft 66. The fork 65 holds the transmission shaft 56 of the fin 51 from the left and right sides. The fork 65 and the transmission shaft 56 of the fin 51 form the transmission mechanism M3.

An operation and advantages of the air-conditioning register 20 of the present embodiment, which has the above-described configuration, will now be described.

In FIG. 4, when the operation knob 61 is at the center in the left-right direction in the fin body 43, the fins 51, 52 are parallel with the vertical walls 25 (neutral state). When the operation knob 61 is slid leftward or rightward along the lower fin 42 from the neutral state, the movement of the operation knob 61 is transmitted to the fin 51 via the fork 65 and the transmission shaft 56 of the transmission mechanism M3. The fin 51 is inclined about the fin pivots 54 in the same direction as the sliding direction of the operation knob 61. The inclining motion of the fin 51 is transmitted to all the fins 52 via the second interlocking mechanism M2. As a result, all the fins 52 are inclined in the same direction as the fin 51 about the fin pivots 54, together with the fin 51, in an interlocking manner. The air-conditioning air A1 flows along the fins 51, 52.

When the lower fin 42 is in the horizontal state as shown in FIGS. 5 to 8, the upper fin 41 is in the horizontal state. Thus, the air-conditioning air A1, which is delivered to the retainer 21 from the air conditioner, flows between the upper wall 26 of the retainer 21 and the upper fin 41, between the upper fin 41 and the lower fin 42, and between the lower fin 42 and the bottom wall 27. However, the clearance between the upper wall 26 and the upper fin 41 is narrower than the clearance between the upper fin 41 and the lower fin 42 and the clearance between the lower fin 42 and the bottom wall 27. Thus, the amount of the air-conditioning air A1 that flows between the upper wall 26 and the upper fin 41 is small, and most of the air-conditioning air A1 that has passed the upstream fins 51, 52 flows between the upper fin 41 and the lower fin 42 and between the lower fin 42 and the bottom wall 27. The air-conditioning air A1 is then blown out substantially in the horizontal direction from the outlet port 14. The solid line in FIG. 10 represents Example that used an air-conditioning register having the same configuration as the present embodiment. Specifically, FIG. 10 shows results of simulations performed to find out the relationship between swing angles in the vertical direction of lower fins and directivity angles in the vertical direction.

Figure 11A:
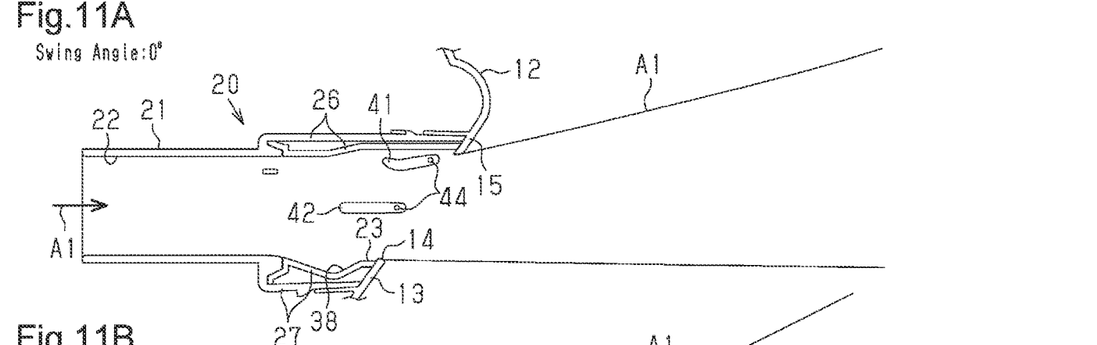
FIGS. 11A to 11D are explanatory diagrams of operations of the air-conditioning register of the embodiment, illustrating the flow of air-conditioning air blown out from the outlet port when the swing angle of the lower fin is changed to 0°, 15°, 25°, and 30°.

FIG. 11A shows the blowing state of the air-conditioning air A1 when the lower fin 42 is in a horizontal state (swing angle: 0°). Example in FIG. 10 and FIG. 11A demonstrate that, although the directivity angle is about 6°, the air-conditioning air A1 is blown out substantially in the horizontal direction as indicated by arrows in FIG. 8. In regard to the left-right direction, the air-conditioning air A1 is blown out in the direction along the upstream fins 51, 52.

With reference to FIG. 5, when an upward force is applied to the downstream end of the operation knob 61 as indicated by the arrow, the force is transmitted to the lower fin 42, which is in the horizontal state. This inclines the lower fin 42 downward about the fin pivots 44 toward the upstream end.

When the lower fin 42 is inclined downward from the horizontal state within a region to an angle close to 30° (the angle being 25° in the present embodiment), the inclining motion is transmitted to the upper fin 41 by the first interlocking mechanism M1. The upper fin 41 is inclined downward together with the lower fin 42 in an interlocking manner.

Generally, when the lower fin 42 is inclined vertically by an angle greater than 25° with respect to the horizontal plane HS, and the inclined wall 15 is inclined with respect to the vertical plane VS by an angle obtained by adding an angle 6-11° to the inclined angle of the lower fin 42, the Coanda effect is supposed to occur.

The Coanda effect is when a flow of fluid such as air or liquid is pulled toward a surface that is adjacent to the flow and extends in a direction different from the direction of the flow, and the flow tends to flow along that surface.

Thus, the Coanda effect does not or is unlikely to occur when the lower fin 42 is in the horizontal state as described above and when the lower fin 42 is inclined downward from the horizontal state within a region to an angle close to 30° (the angle being 25°), and the upper fin 41 is inclined in an interlocking manner. The air-conditioning air A1 flows along the lower fin 42 and the upper fin 41.

As described above, when the swing angle changes within the range from 0° to 25°, the directivity angle changes accordingly to become the same as or substantially the same as the swing angle. In other words, the ratio of the directivity angle to the swing angle is substantially constant. The air-conditioning air A1 is blown out in the direction in which the upper fin 41 and the lower fin 42 are directed from the outlet port 14. Therefore, the air-conditioning air A1 can be blown out to a desired region of the body of the occupant P1 (upper part of the abdomen PB, the thorax PT, or the head PH) as shown in FIG. 2.

Figure 11B:
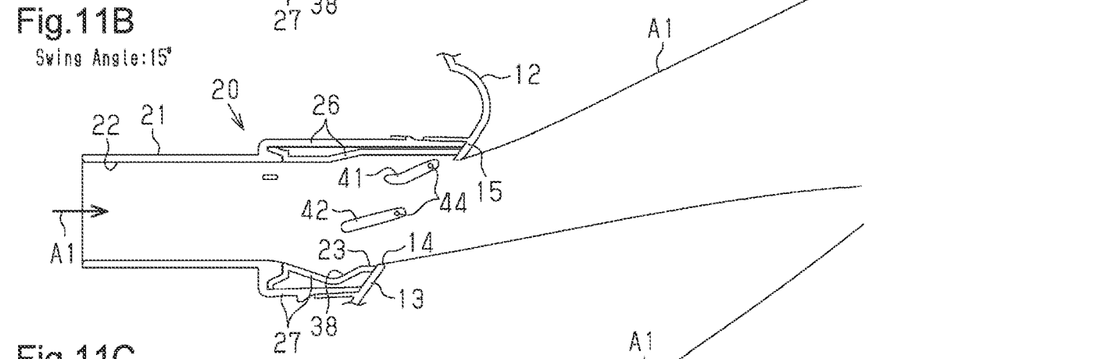

FIG. 11B shows the blowing state of the air-conditioning air A1 when the lower fin 42 is inclined downward by 15° from the horizontal state (swing angle: 15°). Example of FIG. 10 and FIG. 11B demonstrate that the directivity angle is about 17°. This reveals the fact that the air-conditioning air A1 is blown out in substantially the same direction as the direction of the inclination of the lower fin 42.

Figure 11C:
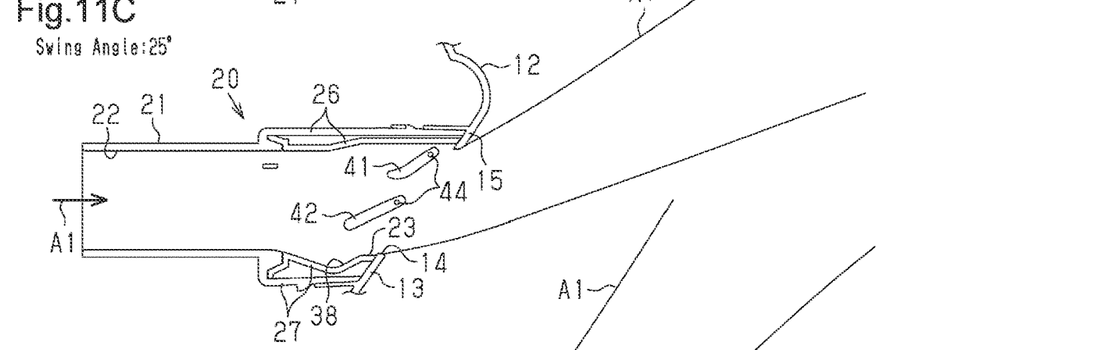

FIG. 11C shows the blowing state of the air-conditioning air A1 when the lower fin 42 is inclined downward by 25° from the horizontal state (swing angle: 25°). Example of FIG. 10 and FIG. 11C demonstrate that the directivity angle is about 25°. This reveals the fact that the air-conditioning air A1 is blown out in substantially the same direction as the direction of the inclination of the lower fin 42.

Example of FIG. 10 demonstrates that the directivity angle changes linearly in correspondence with changes in the swing angle of the lower fin 42 within the region from 0° to 25°, that is, the rate of change of the directivity angle in relation to changes in the swing angle is constant or substantially constant.

Figure 9:
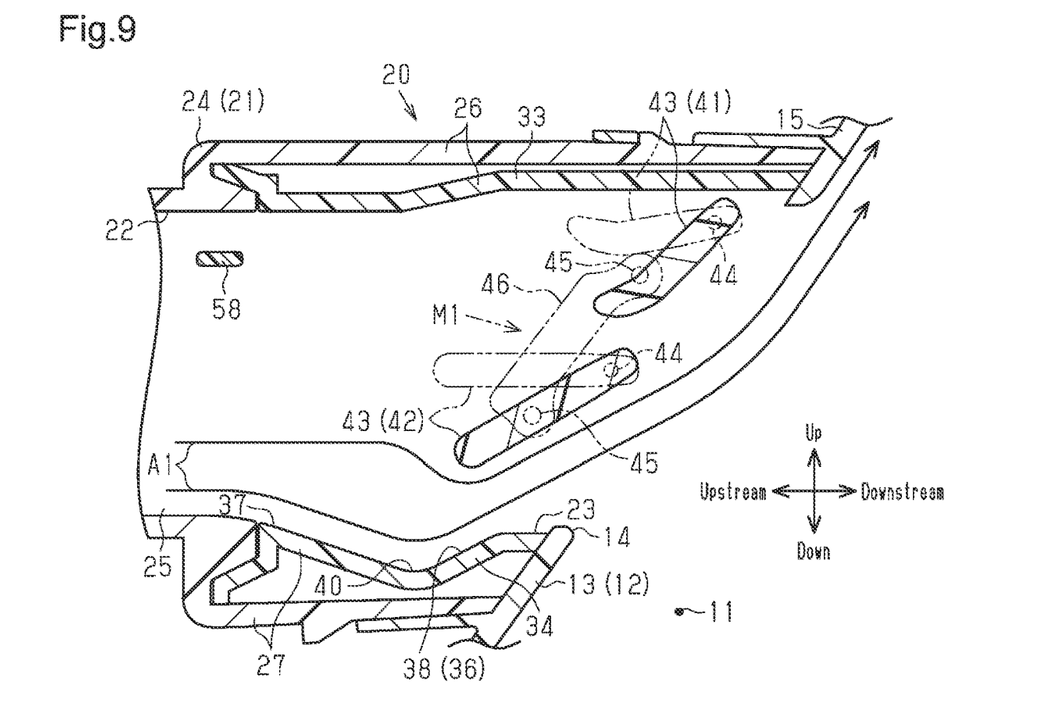
FIG. 9 is a partial cross-sectional side view of the air-conditioning register of the embodiment, illustrating the positional relationship of the upper and lower fins and the vertical coupling rod when the lower fin is inclined downward by the maximum angle from the horizontal state (swing angle: 30°).

When the lower fin 42 is inclined downward such that the swing angle becomes an angle greater than 25° and less than or equal to 30° as shown in FIG. 9, the upper fin 41 is inclined downward together with the lower fin 42 in an interlocking manner. The clearance between the upper fin 41 and the upper wall 26 is further narrowed as compared to the horizontal state of the upper fin 41 shown in FIG. 8, so that the air-conditioning air A1 does not flow smoothly between the upper fin 41 and the upper wall 26.

Also, the clearance between the upper fin 41 and the lower fin 42 is reduced. At this time, the angle of the upper fin 41 with respect to the lower fin 42 is greater than that when in the horizontal state. The upstream end of the upper fin 41 approaches the lower fin 42, so that the clearance therebetween is reduced. When the angle of the upper fin 41 with respect to the lower fin 42 is constant, a gap exists between the upper fin 41 and the lower fin 42, and the air-conditioning air A1 flows through that gap. However, the present embodiment narrows that gap so that the air-conditioning air A1 does not flow smoothly through that gap.

Particularly, in the present embodiment, when the lower fin 42 is inclined downward by the maximum angle (30°), the angle of the upper fin 41 with respect to the lower fin 42 is greater than when in the horizontal state by 5°. The clearance between the upstream end of the upper fin 41 and the lower fin 42 has such a size that the upstream end is unlikely to interfere with the lower fin 42 and that the air-conditioning air A1 does not smoothly pass through the clearance. Thus, the air-conditioning air A1 does not flow smoothly between the upstream end of the upper fin 41 and the lower fin 42. This reduces the amount of the air-conditioning air A1 that flows through the above-described gap.

Although the clearance between the lower fin 42 and the bottom wall 27 is reduced as the lower fin 42 is inclined, the clearance is wider than the clearance between the upper wall 26 and the upper fin 41 and the clearance between the upper fin 41 and the lower fin 42. Thus, the air-conditioning air A1 is restricted from passing through the clearance between the upper wall 26 and the upper fin 41 and from passing through the clearance between the upper fin 41 and the lower fin 42. Most of the air-conditioning air A1 in turn flows between the lower fin 42 and the bottom wall 27.

An example assumes that the bottom wall 27 lacks the downstream inclined surface 38 under the upstream end of the lower fin 42. In this case, even if the lower fin 42 is inclined upward toward the downstream end, at least part of the air-conditioning air A1 flows linearly toward the downstream side along the bottom wall 27. This reduces the amount of the air-conditioning air A1 of which the flowing direction is changed by flowing along the lower fin 42.

In this respect, the bottom wall 27 of the present embodiment includes the recess 36 under the upstream end of the lower fin 42. As described above, most of the air-conditioning air A1 flows between the lower fin 42 and the bottom wall 27. Thus, part of the air-conditioning air A1 that flows in the vicinity of the bottom wall 27 is likely to enter the recess 36.

As described above, the upstream inclined surface 37 is inclined downward by a constant angle with respect to the horizontal plane HS toward the downstream end. The downstream inclined surface 38, which is formed in the recess 36, is inclined upward by the constant angle β with respect to the horizontal plane HS toward the downstream end. The upstream end of the upstream inclined surface 37 is located at the upstream end of the recess 36, and the downstream end of the downstream inclined surface 38 is located at the downstream end of the recess 36. The air-conditioning air A1 that has entered the recess 36 flows along the upstream inclined surface 37, while changing the flowing direction to the diagonally downward direction, and is then guided to the downstream inclined surface 38. The flowing direction is therefore not changed abruptly.

Further, although the downstream inclined surface 38 is inclined toward the side opposite to the upstream inclined surface 37, the upstream inclined surface 37 and the downstream inclined surface 38 are connected to each other by the curved surface 40, which is curved in a manner bulging downward. This causes the air-conditioning air A1 to flow along the curved surface 40, so that the air-conditioning air A1 is guided to the downstream inclined surface 38 while gradually changing the flowing direction.

The air-conditioning air A1 flows along the downstream inclined surface 38, so that the flowing direction is inclined upward toward the downstream end. Thereafter, the air-conditioning air A1 flows downstream from the recess 36.

During the period in which the air-conditioning air A1 enters, flows in, and leaves the recess 36, the air-conditioning air A1 flows smoothly without the flowing direction being changed abruptly.

The air-conditioning air A1, which has exited the recess 36, is guided to the clearance between the bottom wall 27 and the lower fin 42, which is inclined upward toward the downstream end, and then flows along the lower fin 42.

The angle β (30°±5°), by which the downstream inclined surface 38 is inclined with respect to the horizontal plane HS, is similar to the angle of the lower fin 42 when inclined by the maximum angle (30°). The flowing direction of the air-conditioning air A1 that flows along the downstream inclined surface 38 is substantially the same as the flowing direction of the air-conditioning air A1 that flows along the lower fin 42. This further increases the amount of the air-conditioning air A1 that flows along the lower fin 42.

The air-conditioning air A1 that has passed the lower fin 42 subsequently flows along the upper fin 41, so as to flow in a direction inclined upward toward the downstream end.

In the air-conditioning register 20 of the present embodiment, the inclined wall 15 is inclined by 30° to 40° with respect to the vertical plane VS. The Coanda effect occurs when the lower fin 42 is inclined downward such that the swing angle is greater than 25° and less than or equal to 30°. Accordingly, the air-conditioning air A1 that flows in a direction inclined upward toward the downstream end as described above passes through the outlet port 14, and is then pulled toward the upper inclined wall 15 when passing the inclined wall 15. The air-conditioning air A1 flows in a direction along the inclined wall 15, that is, in a direction inclined upward toward the downstream end.

Figure 11D:
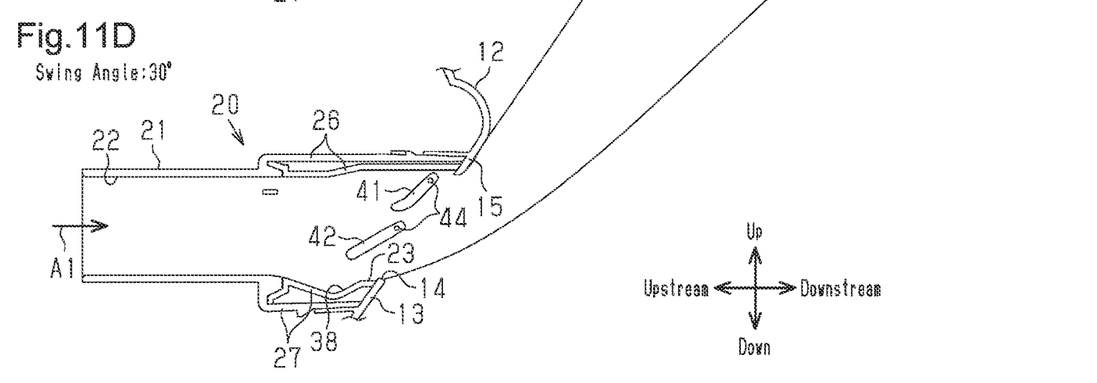

FIG. 11D shows the blowing state of the air-conditioning air A1 when the lower fin 42 is inclined downward by 30° from the horizontal state (swing angle: 30°). Example of FIG. 10 and FIG. 11D demonstrate that the directivity angle is about 45°. This reveals the fact that the air-conditioning air A1 is blown out in a direction that is more upward than the direction in which the lower fin 42 is inclined.

Accordingly, even though the outlet port 14 of the air-conditioning register 20 is located in a lower position in front of the occupant P1 (in front of the abdomen PB or the thorax PT) as shown in FIG. 2, the air-conditioning air A1 flows to a region that ranges from the upper part of the abdomen PB to the space above the head PH of the occupant P1 as indicated by the long-dash double-short-dash lines in FIG. 2. When the lower fin 42 is inclined downward by the maximum angle, the air-conditioning air A1 flows to the space above the head PH. In this case, the air-conditioning air A1 is not directed to the occupant P1. As described above, the present embodiment is capable of blowing out the air-conditioning air A1 to a desired region on the upper body of the occupant P1, while expanding the variable range of the directivity angle in the vertical direction upward by using the Coanda effect.

The operation and advantages of the case in which the lower fin 42 is inclined downward from the horizontal state (swing angle: 0°) have been described. The same operation and advantages are achieved in a case in which the lower fin 42 is inclined upward to the horizontal state from the state of being inclined by the maximum angle (swing angle: 30°). Thus, detailed explanation for this case is omitted.

The above-described embodiment may be modified as follows.

A part of the bottom wall 27 that is on the upstream side of the downstream inclined surface 38 may be lowered to the same level as the upstream end of the downstream inclined surface 38. In this case, the upstream inclined surface 37 is omitted.

The fin pivots 44 of the upper fin 41 and the lower fin 42 may be provided at middle portions or the upstream ends in the flowing direction of the air-conditioning air A1, instead of the downstream ends.

The downstream inclined surface 38 may be a flat surface. Alternatively, the downstream inclined surface 38 may be a curved surface that is curved in a manner bulging upward or downward on condition that the downstream inclined surface 38 is inclined upward toward the downstream end as a whole. Likewise, the upstream inclined surface 37 may be a flat surface. Alternatively, the upstream inclined surface 37 may be a curved surface that is curved in a manner bulging upward or downward on condition that the upstream inclined surface 37 is inclined downward toward the downstream end as a whole.

When the lower fin 42 is inclined downward with respect to the horizontal plane HS by the maximum angle, the angle of the upper fin 41 with respect to the lower fin 42 may be increased by an angle that is different from that in the horizontal state and is less than 5°. Even in this case, the clearance between the upstream end of the upper fin 41 and the lower fin 42 has such a size that the upstream end is unlikely to interfere with the lower fin 42 and that the air-conditioning air A1 does not smoothly pass through the clearance.

The air-conditioning register 20 may be employed in a wide range of vehicles other than land vehicles, as long as the instrument panel 12 is employed.

DESCRIPTION OF THE REFERENCE NUMERALS

12 . . . Instrument Panel; 13 . . . Rear Wall; 14 . . . Outlet Port; 15 . . . Inclined Wall; 20 . . . Air-Conditioning Register; 21 . . . Retainer; 22 . . . Vent Passage; 23 . . . Downstream End; 26 . . . Upper Wall; 27 . . . Bottom Wall; 36 . . . Recess; 37 . . . Upstream Inclined Surface; 38 . . . Downstream Inclined Surface (Inclined Surface); 40 . . . Curved Surface; 41 . . . Upper Fin; 42 . . . Lower Fin; 44 . . . Fin Pivots; A1 . . . Air-Conditioning Air; HS . . . Horizontal Plane; M1 . . . First Interlocking Mechanism (Interlocking Mechanism); VS . . . Vertical Plane; α,β . . . Angles

The invention claimed is:

1. An air-conditioning register, comprising a retainer, wherein
the retainer includes a vent passage for air-conditioning air,
the vent passage includes a downstream end in a direction of a flow of the air-conditioning air in the retainer, the downstream end being connected to an outlet port in a rear wall of an instrument panel,
the rear wall includes an inclined wall in a section above and adjacent to the outlet port, the inclined wall inclined upward toward a downstream side, and an angle defined by the inclined wall and a vertical plane being from 30° to 40°, the retainer accommodates an upper fin and a lower fin, the lower fin and the upper fin are located on an upstream side of the outlet port, the lower fin extends in a vehicle width direction, the upper fin is located above the lower fin and extends in the vehicle width direction, the lower fin and the upper fin are both supported by fin pivots so as to be inclinable vertically, downstream ends of an upper wall of the retainer, the upper fin, the lower fin, and a bottom wall of the retainer are arranged to be progressively shifted to an upstream side toward a lower end, the lower fin is configured to be inclinable upward toward the downstream end by at most 30° with respect to a horizontal plane, the air-conditioning register further comprises an interlocking mechanism configured such that, when the lower fin is inclined by a maximum angle with respect to the horizontal plane so as to be inclined upward toward the downstream end, the interlocking mechanism inclines the upper fin together with the lower fin in an interlocking manner such that an angle of the upper fin with respect to the lower fin is greater than that when in a horizontal state of the lower fin and the upper fin, and the bottom wall includes an inclined surface located under an upstream end of the lower fin, the inclined surface being inclined upward toward the downstream end.

2. The air-conditioning register according to claim 1, wherein, when the lower fin is inclined by the maximum angle with respect to the horizontal plane, the interlocking mechanism increases the angle of the upper fin with respect to the lower fin by at most 5° as compared to when in the horizontal state.

3. The air-conditioning register according to claim 1, wherein the inclined surface is a downstream inclined surface, the bottom wall includes a recess that is recessed downward, the downstream inclined surface is formed in a downstream portion of an inner bottom surface of the recess, the recess includes an upstream inclined surface in the inner bottom surface, and the upstream inclined surface is located on an upstream side of the downstream inclined surface and is inclined downward toward the downstream end.

4. The air-conditioning register according to claim 3, wherein the upstream inclined surface and the downstream inclined surface are connected to each other by a curved surface that is curved so as to bulge downward.

5. The air-conditioning register according to claim 3, wherein the downstream inclined surface is inclined by 30°±5° with respect to the horizontal plane.

* * * * *